Aug. 12, 1941.   J. P. BENOIT ET AL   2,252,392
GLASS SHEARING MECHANISM
Filed Feb. 16, 1939   6 Sheets-Sheet 1

INVENTORS.
J. P. Benoit, R. G. Allen and
L. H. Wideman
BY Rule & Hoge
ATTORNEYS.

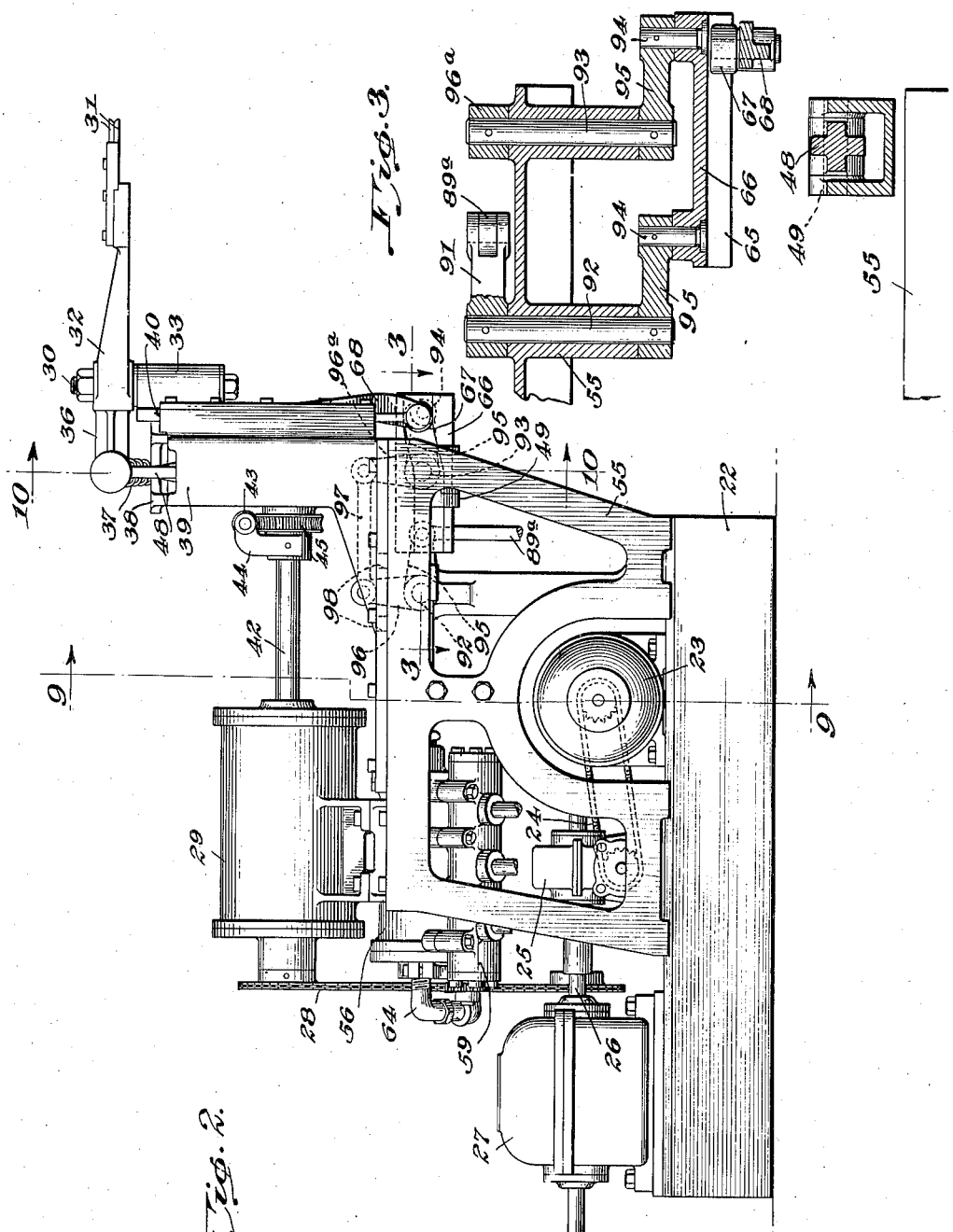

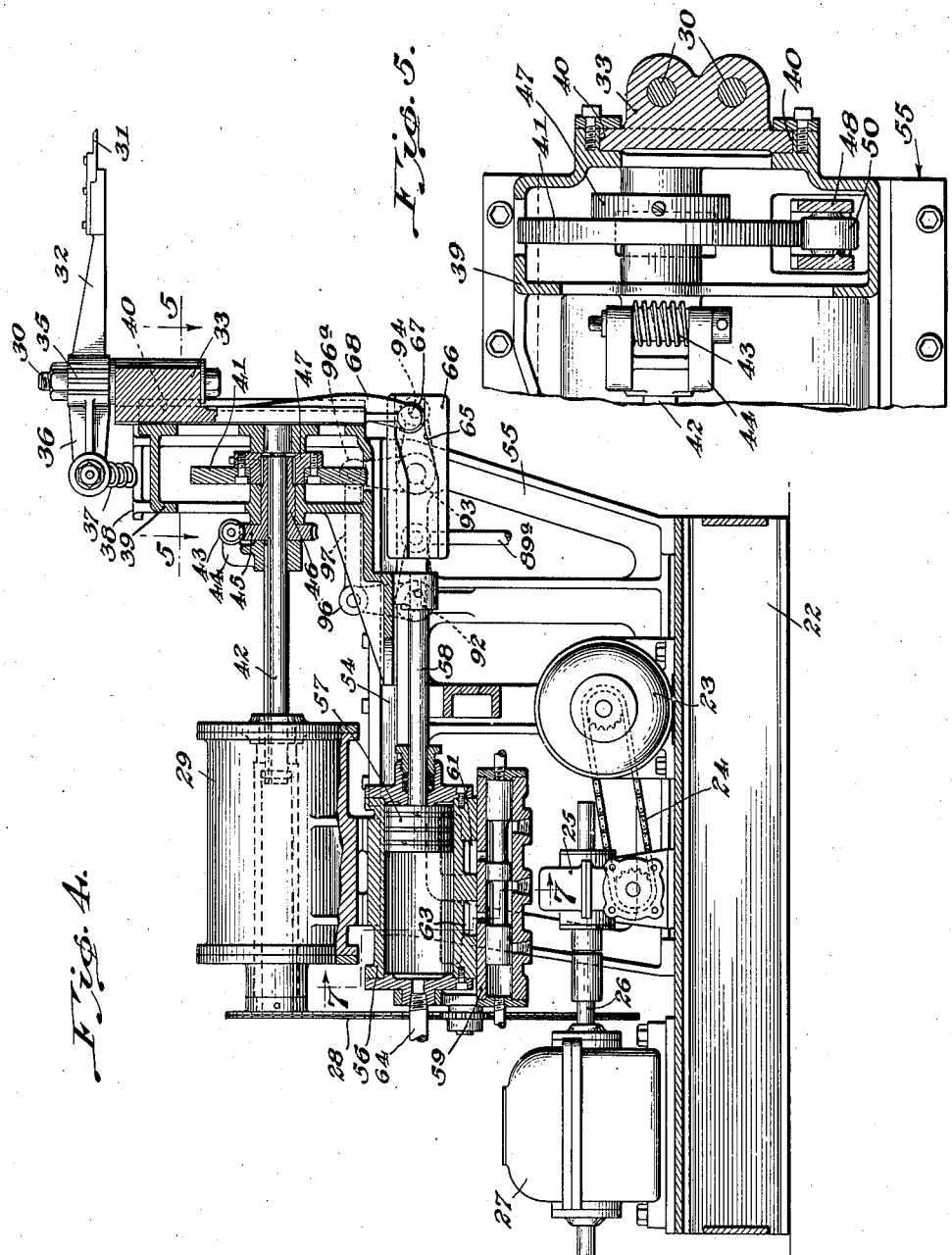

Aug. 12, 1941.  J. P. BENOIT ET AL  2,252,392
GLASS SHEARING MECHANISM
Filed Feb. 16, 1939  6 Sheets-Sheet 4
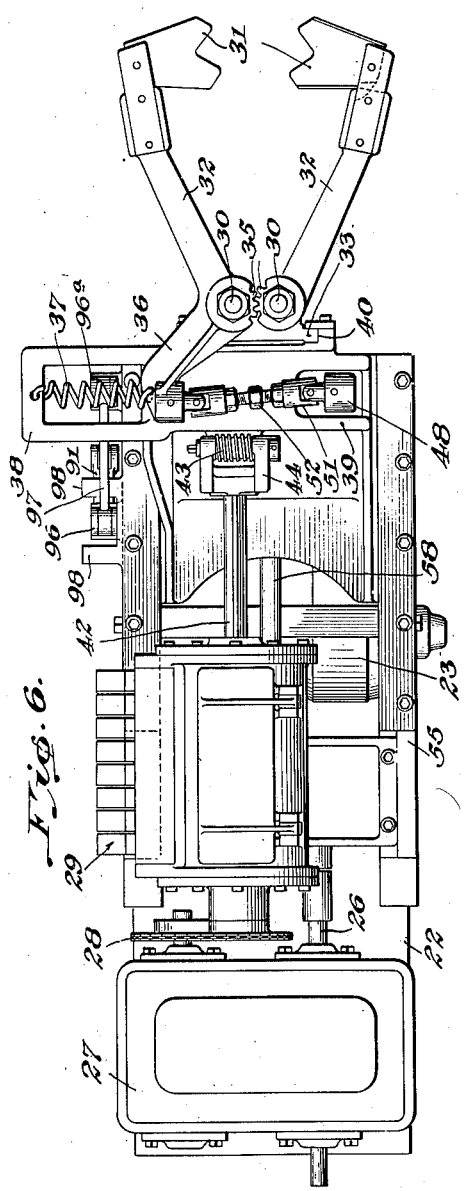
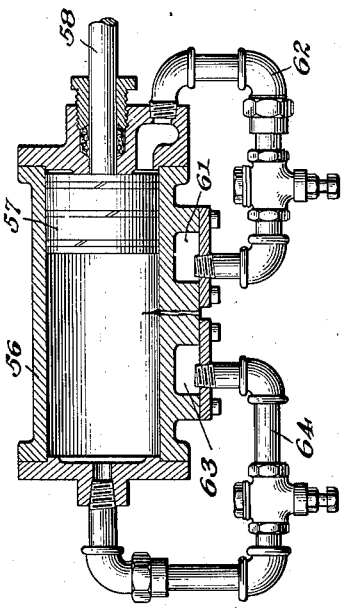
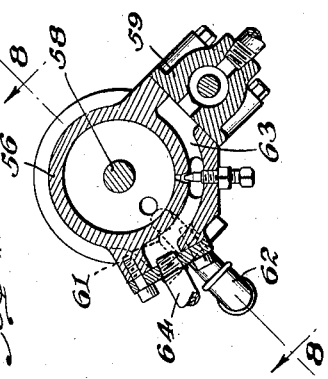
INVENTORS.
J. P. Benoit, R. G. Allen
and L. H. Wideman
BY Rule & Hoge
ATTORNEYS.

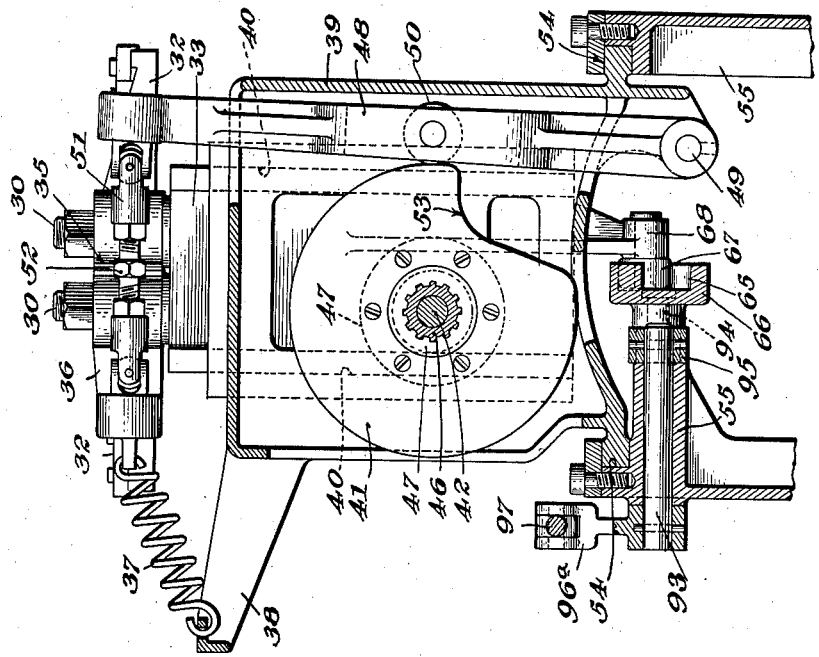
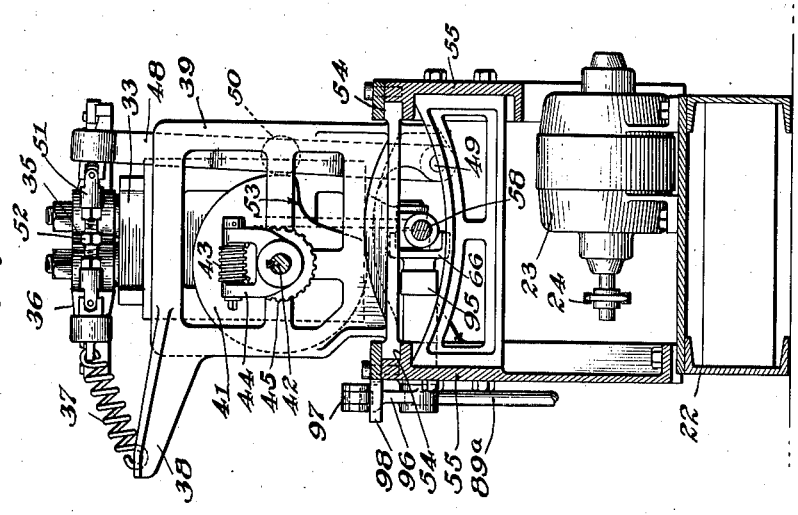

INVENTORS.
J. P. Benoit, R. G. Allen
and L. H. Wideman,
BY Rule & Hoge
ATTORNEYS.

Patented Aug. 12, 1941

2,252,392

UNITED STATES PATENT OFFICE 2,252,392

GLASS SHEARING MECHANISM

Joseph P. Benoit, Russell G. Allen, and Luther H. Wideman, Alton, Ill., assignors to Owens-Illinois Glass Company, a corporation of Ohio Application February 16, 1939, Serial No. 256,708

14 Claims. (Cl. 49—14)

Our invention relates to apparatus for molding glass articles and particularly to shearing mechanism for shearing mold charges of molten glass from a supply body. As herein illustrated the shearing mechanism is designed for use with glass blowing machines of the suction gathering type in which molds are dipped into a pool of molten glass, filled by suction, then lifted and the glass in the mold severed from the supply body. Our invention provides novel apparatus comprising a pair of shears, means for bodily projecting the shears to and from a severing position, means for actuating the shears to sever the glass, and means for lowering the shears as they are withdrawn. In accordance with the present invention the shears and shear actuating mechanism are mounted separately from the mold carriage.

An object of the invention is to provide novel means for automatically adjusting the shear mechanism up and down in synchronism with up and down adjustments of the mold carriage, which adjustments may be required for various purposes, as for example, when necessitated by fluctuations in the surface level of the supply body of glass.

A further object of the invention is to provide automatic means for maintaining the shears at an approximately constant level while the mold carriage is adjustable up or down to accommodate molds of different lengths, and at the same time maintaining operating connections permitting automatic adjustment of the shears up and down with the molds through short ranges.

A further object of the invention is to provide a novel combination of the shear mechanism and the timer mechanism by which the shearing operations and other functions of the glass blowing machine are effected.

Other objects of the invention will appear hereinafter.

Referring to the accompanying drawings:

Fig. 2 is an elevation of the shears and operating mechanism therefor, looking in a direction at right angles to that of Fig. 1;

Fig. 3 is a section at the line 3—3 on Fig. 2, showing parallel link mechanism for lifting and lowering the shears;

Fig. 4 is a part sectional elevation of the apparatus shown in Fig. 2;

Fig. 5 is a section at the line 5—5 on Fig. 4, showing particularly the cam controlling the shearing movements of the shears;

Fig. 6 is a plan view of the apparatus shown in Figs. 2 and 4;

Fig. 7 is a cross sectional view taken at the line 7—7 on Fig. 4, showing the piston motor for reciprocating the shear carriage;

Fig. 8 is a longitudinal section of said motor at the line 8—8 on Fig. 7;

Figure 1:
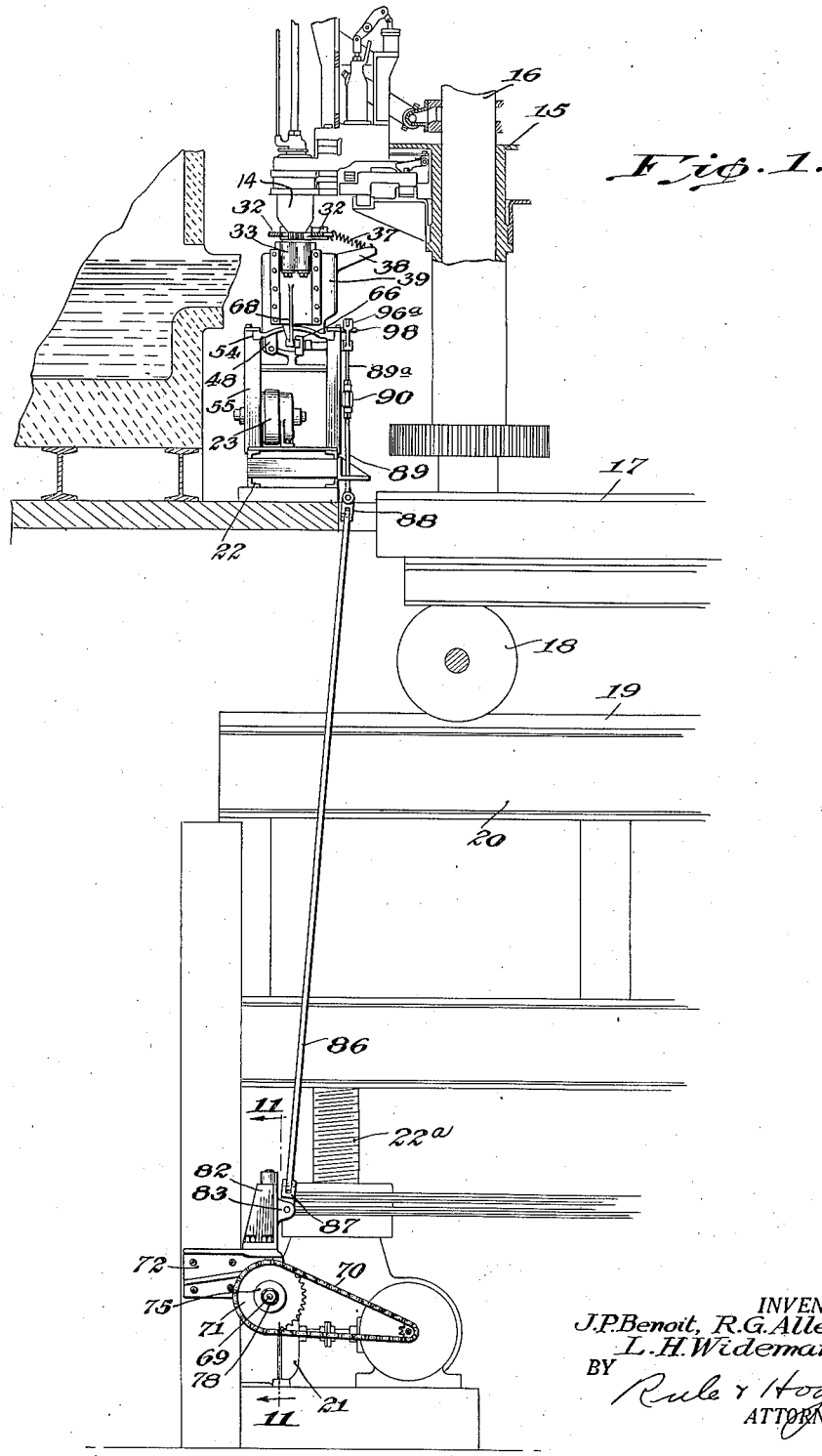
Fig. 1 is a diagrammatic part sectional elevation of apparatus embodying the present invention.
Figure 11:
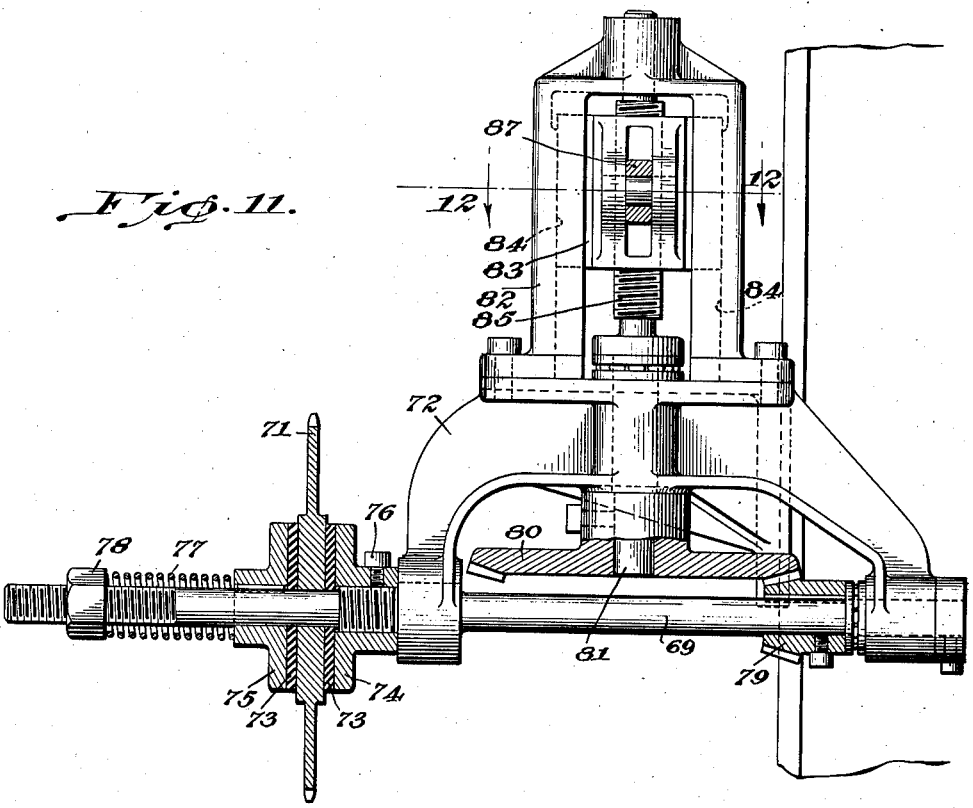
Figure 12:
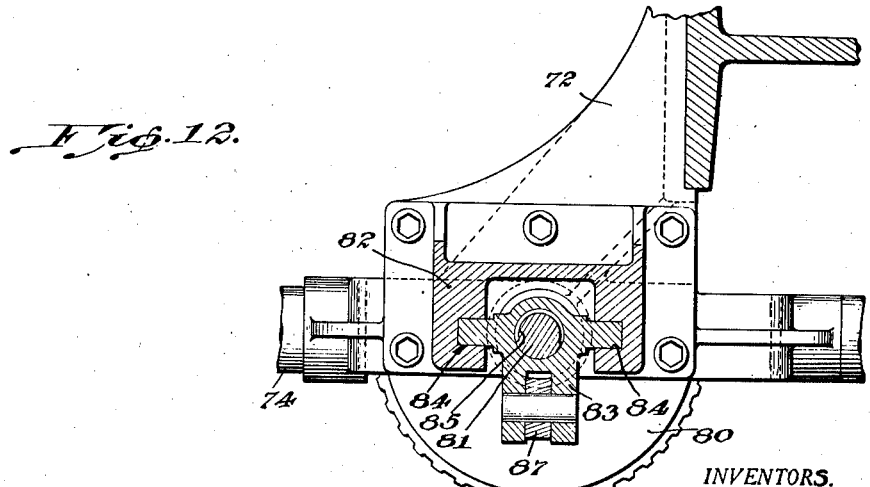

Figs. 9 and 10 are sectional elevations at the lines 9—9 and 10—10 respectively on Fig. 2, Fig. 10 being on an enlarged scale;

Fig. 11 is a section at the line 11—11 on Fig. 1, showing apparatus for lifting and lowering the shears automatically in synchronism with vertical adjustments of the blowing machine; and Fig. 12 is a section at the line 12—12 on Fig. 11.

The shearing mechanism herein shown is particularly designed for use with a glass blowing machine such as disclosed in our copending application, Serial No. 246,334 filed December 17, 1938.

Referring to Fig. 1, the blowing machine comprises a mold carriage 15 with molds 14 thereon, the carriage being mounted for continuous rotation about a vertical center column 16 carried on a machine base 17 having wheels 18 which run on tracks 19 on a vertically adjustable framework 20. Mechanism for adjusting the framework 20 up and down and thereby adjusting the mold carriage up and down, comprises an electric motor 21 having driving connections through speed reduction gearing (not shown) for actuating lifting jacks 22ª for lifting and lowering the frame 20 and with it the blowing machine, in a conventional manner.

Referring to Figs. 1, 2, and 4, the shear operating mechanism is mounted on a base 22. An electric motor 23 mounted on the base has a driving connection through a sprocket chain 24 and speed reduction gearing within a gear box 25, to a shaft 26. The latter has a driving connection, through speed reduction gearing within a gear box 27, with a sprocket chain 28 which drives the shaft 42 of a timer 29, the latter controlling the various operations of the glass blowing machine. Such operations, as disclosed in our copending application above referred to, are effected by air motors controlled by valves individual thereto, the valves in turn being under the control of the timer 29. Each complete rotation of the timer shaft 42 effects a cycle of operations of the blowing machine.

A pair of shears (see Figs. 4 and 6) comprises blades 31 carried on shear arms 32 mounted to swing about vertical pivots 30 on a shear carrying head 33. Intermeshing segmental gears 35 on the shear arms cause the shear blades to swing in unison. One of the shear arms is formed with an extension 36 to the outer end of which is connected one end of a coil spring 37, the other end of the spring being connected to a bracket arm 38 on a vertically disposed frame 39 which serves as a carriage for the shears. The head 33 is mounted to be reciprocated vertically in guideways 40 on the frame 39, by means hereinafter described.

The shearing movements of the shears are under the control of a disk cam 41 mounted to rotate with the timer shaft 42 which is rotated continuously by the sprocket chain 28. The driving connections between the shaft 42 and the cam 41 (see Figs. 4 and 5) include a worm 43 carried on a yoke 44 splined on the shaft 42 to rotate therewith. The worm 43 meshes with a worm gear 45 journalled on the shaft 42, the worm gear having a hub or sleeve extension 46 journalled in the frame 39. The cam 41 is bolted to a hub 47 having a fixed mounting on the sleeve 46. It will thus be seen that the cam 41 is connected to rotate with the shaft 42. The worm 43 provides an adjusting means for rotatively adjusting the cam relative to its driving shaft and thereby timing the operation of the shears.

Operating connections between the cam and the shears (see Fig. 10) include a vertically disposed rock arm 48 having a pivotal connection 49 at its lower end with the frame 39. A cam roll 50 on the arm 48 is held against the cam by the tension of the spring 37 which is connected to the upper end of said arm through linkage 51 including an adjusting rod 52, the latter permitting adjustment of the shear blades toward and from each other. The cam 41 is rotated continuously in a counter-clockwise direction (Figs. 9 and 10) and is formed with a steep cam surface 53, permitting a quick inward movement of the arm 48 under the influence of the spring 37, thereby effecting a quick closing movement of the shears.

In addition to the shearing movements of the shears, the shear carrying head 33 is periodically reciprocated for moving the shears bodily toward and from a position beneath the mold at the gathering station. To permit this movement the carriage 39 is mounted to reciprocate horizontally in guides 54 on a framework 55 mounted on the base 22. The means for reciprocating the carriage 39 comprises an air operated piston motor including a cylinder 56, piston 57 and piston rod 58, the latter connected to the carriage 39. Air under pressure for operating the piston motor is supplied to the cylinder 56 under the control of a valve 59 (Fig. 4) which may be of conventional construction. The air supply for operating the valve 59 is under the control of the timer 29. When the valve piston is moved to the right as shown in Fig. 4, air under pressure is admitted through the valve to a port 61 (Figs. 4 and 8) and from thence through a pipe 62 (Fig. 8) to the right-hand end of the motor cylinder so that the piston 57 is moved to the left, thereby retracting the frame 39 and shears 31. When the valve piston is reversed, air pressure is admitted to a port 63 and through a pipe 64 to the left-hand end of the motor cylinder so that the shear head is projected to operative position (Fig. 4 and 6). As the shaft 42, or at least the part thereof on which the cam 41 and worm gear drive 43 to 47 are mounted, must be free to move longitudinally with the reciprocating carriage 39, it has a longitudinally slidable mounting in the timer casing, the shaft preferably comprising telescopic sections.

When the piston motor operates to withdraw the shears, the latter at the same time are given a downward movement under the control of a cam track 65 formed in a cam plate 66. A cam roll 67 running on the cam track is carried on an arm 68 extending downward from the head 33. As shown in Fig. 4, the forward portion of the cam track is downwardly and rearwardly inclined so that during the initial retracting movement of the shear head, the shears are lowered a short distance.

The mechanism interconnecting the shears with the means for adjusting the blowing machine up and down will now be described. Such mechanism serves the purpose of automatically maintaining the shears at the proper level when the blowing machine or the mold carriage is adjusted up or down as is sometimes necessary or desirable. Such adjustment may be needed, for example, to regulate the depth to which the molds enter the glass during the charging operation, or when there is a change in the level of the glass.

Referring to Figs. 1, 11 and 12, the motor 21 which operates as heretofore described for lifting and lowering the blowing machine, also has driving connections through speed reduction gearing with a shaft 69, said connections including a sprocket chain 70 and sprocket wheel 71. The shaft 69 is journalled in a stationary bracket 72. The sprocket wheel 71 (see Fig. 11) has a frictional driving connection with the shaft, being held between the friction disks 73 mounted on the shaft between bearing plates 74 and 75. The plate 74 is threaded on the shaft and clamped in position by a screw 76. The plate 75 is splined on the shaft and bears against the adjoining friction disk with a pressure applied by means of a coil spring 77, the compression of which may be adjusted by an adjusting nut 78 threaded on the shaft. Keyed to the shaft 69 is a bevel pinion 79 which runs in mesh with a bevel gear 80 keyed to a vertical shaft 81 journalled in the bracket 72. Mounted on the bracket 72 is a frame or housing 82. A slide block 83 is mounted for up and down movement in guideways 84 formed in the frame 82. The shaft 81 comprises a screw threaded section 85 which extends through a correspondingly threaded opening in the slide block 83 so that rotation of the shaft 81 imparts vertical movement to the slide block.

A vertically disposed rod 86 is connected by a universal joint 87 at its lower end with the slide block 83. The upper end of the rod 86 is connected by a universal joint 88 with the lower end of a vertical rod 89, the latter connected by a turn buckle 90 to a rod 89ª. The upper end of the rod 89ª (see Figs. 2 and 3) is pivotally connected with a horizontally disposed rock arm 91 keyed to a rock shaft 92, the latter journalled in the frame 55. A second rock shaft 93 is also journalled in the frame 55 parallel with the shaft 92, the shafts 92 and 93 being in the same horizontal plane. The cam plate 66 is connected by pivot pins 94 with a pair of rock arms 95 keyed to the shafts 92 and 93, thereby providing a parallel link connection between the cam plate and the rock shafts. Rock arms 96 and 96ª keyed to the shafts 92 and 93 extend upwardly therefrom and are connected at their upper ends by a rod 97, thus providing a second parallel link connection between the rock shafts. It will be seen that when the motor 21 is operated for adjusting the blowing machine up or down, it will operate to impart up or down movement to the rods 86, 89 and 89ª. Such movement serves to rock the shafts 92 and 93 and thereby move the cam plate 66 bodily up or down, thus lifting or lowering the shears. The parts are so proportioned that the same degree of vertical movement is imparted to the shears as to the mold carriage and molds.

When the molds on the blowing machine are changed or replaced by other molds, either longer or shorter, it becomes necessary either to raise or to lower the mold carriage through a corresponding distance so that the lower or charge receiving ends of the molds will be brought to the proper level for gathering the mold charges of glass. In order to permit this adjustment of the mold carriage without moving the shears up and down to the same degree, stops 98 are provided on opposite sides of the rock arm 96 to limit the swinging movement of the rock arm. If, for example, the machine has been operating with comparatively short molds and these are exchanged for a set of long molds, it is necessary to raise the mold carriage a distance equal to the difference between the lengths of the long and short molds. This lifting of the mold carriage is effected by operating the motor 21. The initial upward movement will operate through the rods 86, 89 and 89ª, to rock the shaft 92 and rock arm 96 until the latter strikes the stop 98. The upward movement of the shears is thus arrested. As the motor 21 continues to lift the mold carriage, the sprocket disk 71 turns idly on the shaft 69, permitting the molds to be adjusted upwardly independently of the shears. As the vertical movement of the shears which takes place before being arrested by the stop 98 is only through a short distance, the shears can be readjusted by means of the turn buckle 90, thereby again bringing them to a proper level for cooperation with the molds.

Modifications may be resorted to within the spirit and scope of our invention.

We claim:

1. Apparatus for forming glass articles comprising a mold carriage mounted for horizontal rotation, a mold thereon, a cutter mounted independently of the mold carriage, means for actuating the cutter for severing mold charges, means for adjusting the mold carriage and mold up and down, and automatic mechanism interconnected with said mold carriage adjusting means and the cutter for automatically adjusting the cutter up and down with the mold carriage and thereby maintaining a constant relative position of the mold and cutter during said adjustment.

2. Apparatus for forming glass articles comprising a mold carriage mounted for horizontal rotation, a mold thereon, a cutter mounted independently of the mold carriage, means for actuating the cutter for severing mold charges, a motor, driving connections between the motor and mold carriage for lifting and lowering the carriage when the motor is driven, and driving connections between said motor and the cutter by which said driving of the motor causes the cutter to be lifted and lowered in synchronism with the up and down movements of the mold carriage.

3. The combination of a mold carriage, a suction gathering mold thereon, a cutter mounted independently of the mold carriage, mechanism for adjusting the mold carriage up and down, and interconnected mechanism between the mold carriage and cutter for adjusting the cutter up and down with the mold carriage.

4. The combination of a mold carriage, a suction gathering mold thereon, a cutter mounted independently of the mold carriage, mechanism for adjusting the mold carriage up and down, and mechanism for automatically adjusting the cutter up and down with the mold through a limited range and then arresting the cutter during said adjustment of the mold carriage and permitting the mold and carriage to be adjusted up or down beyond said range while the cutter remains stationary.

5. The combination of a glass blowing machine comprising a rotary mold carriage and a mold thereon, a vertically adjustable support on which the machine is mounted, an electric motor, lifting mechanism actuated by said motor for adjusting the mold carriage vertically, a cutter cooperating with the mold, mechanism for mounting the cutter separate from the mold carriage, and means actuated by said motor for automatically moving the cutter upwardly in synchronism with the movements of the mold and to an extent commensurate with said movements when the carriage is lifted by said motor.

6. The combination of a glass blowing machine comprising a rotary mold carriage and a mold thereon, a vertically adjustable support on which the machine is mounted, an electric motor, lifting mechanism actuated by said motor for adjusting the mold carriage vertically, a cutter cooperating with the mold, mechanism for mounting the cutter separate from the mold carriage, automatic means including a driving connection between the motor and the cutter for lifting the cutter when the mold carriage is lifted by said motor, and a stop to limit the upward movement of the cutter while the mold carriage is in an intermediate position during said vertical adjustment, said driving connections for the cutter including a friction clutch.

7. Mechanism for severing mold charges comprising a supporting frame, a carriage mounted to reciprocate horizontally thereon, a shear blade mounted to move with said carriage and pivoted to swing horizontally thereon, means for swinging said blade about its pivot, and automatic means for lifting and lowering the blade during its said movement with said carriage.

8. Mechanism for severing mold charges comprising a supporting frame, a carriage mounted to reciprocate horizontally thereon, a shear blade mounted to move with said carriage and pivoted to swing horizontally thereon, means for swinging said blade about its pivot, a stationary cam, and means actuated by said cam for lifting and lowering the blade during its reciprocating movement with the carriage.

9. The combination of a pair of shears, a head on which said shears are mounted, a carriage mounted to reciprocate horizontally, a piston motor connected to the carriage for reciprocating it, said head mounted to reciprocate with the carriage, a spring for actuating the shears, a cam controlling the action of the shears, a stationary cam, and operating connections between the stationary cam and said head, said stationary cam being operative through said connections to move the shears up and down during their reciprocating movements.

10. The combination of a pair of shears, a head on which said shears are mounted, a carriage mounted to reciprocate horizontally, a piston motor connected to the carriage for reciprocating it, said head mounted to reciprocate with the carriage, a spring for actuating the shears, a cam controlling the action of the shears, a stationary cam, operating connections between the stationary cam and said head, said stationary cam being operative through said connections to move the shears up and down during their reciprocating movements, and means for adjusting said stationary cam up and down and thereby adjusting the shears up and down.

11. The combination of a rotary mold carriage, molds thereon, means controlling the rotary movements of the mold carriage including a timer, shear mechanism mounted separately from the mold carriage including a pair of shears, a carriage on which the shears are mounted, a piston motor operative to reciprocate said last mentioned carriage, means actuated by the timer for controlling the operation of the piston motor, and an electric motor for driving the said timer.

12. The combination of a pair of shears, a head frame on which the shears are mounted, a carriage mounted for horizontal reciprocation, a motor for reciprocating said carriage, said head frame mounted for vertical sliding movement on the carriage, a stationary cam, and operating connections between the cam and said head frame by which the latter is moved up and down during the reciprocating movements of the carriage.

13. The combination of a pair of shears, a head frame on which the shears are mounted, a carriage mounted for horizontal reciprocation, a motor for reciprocating said carriage, said head frame mounted for vertical sliding movement on the carriage, a stationary cam, operating connections between the cam and said head frame by which the latter is moved up and down during the reciprocating movements of the carriage, parallel rock shafts, rock arms thereon, said cam being connected to the rock arms, and means for rocking said shafts and thereby lifting and lowering the cam and causing the latter to lift and lower said head frame independently of the reciprocating movements of said carriage.

14. The combination of a mold carriage, a mold thereon, a cutter mounted separately from the mold carriage, means for adjusting the carriage and mold up and down, and interconnected mechanism between the mold carriage and cutter operable automatically when the mold carriage is adjusted up and down to effect commensurate up and down adjustments of the cutter.

JOSEPH P. BENOIT.
RUSSELL G. ALLEN.
LUTHER H. WIDEMAN.